(12) United States Patent
Chen et al.

(10) Patent No.: US 9,645,307 B2
(45) Date of Patent: May 9, 2017

(54) BACKLIGHT MODULE AND LIQUID CRYSTAL DISPLAY DEVICE

(71) Applicant: Shenzhen China Star Optoelectronics Technology Co., Ltd., Shenzhen, Guangdong (CN)

(72) Inventors: Shihhsiang Chen, Guangdong (CN); Dehua Li, Guangdong (CN); Yuchun Hsiao, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 307 days.

(21) Appl. No.: 14/396,752

(22) PCT Filed: Aug. 27, 2014

(86) PCT No.: PCT/CN2014/085269
§ 371 (c)(1),
(2) Date: Oct. 24, 2014

(87) PCT Pub. No.: WO2016/026159
PCT Pub. Date: Feb. 25, 2016

(65) Prior Publication Data
US 2016/0274295 A1 Sep. 22, 2016

(30) Foreign Application Priority Data

Aug. 19, 2014 (CN) .......................... 2014 1 0413408

(51) Int. Cl.
*G02F 1/1335* (2006.01)
*F21V 8/00* (2006.01)

(52) U.S. Cl.
CPC ......... *G02B 6/0088* (2013.01); *G02B 6/0028* (2013.01); *G02B 6/0091* (2013.01); *G02F 1/1336* (2013.01); *G02B 6/0066* (2013.01)

(58) Field of Classification Search
CPC ... G02B 6/0088; G02B 6/0028; G02B 6/0091
USPC ......................................................... 349/63
See application file for complete search history.

(56) References Cited

FOREIGN PATENT DOCUMENTS

CN 103090303 A 5/2013

*Primary Examiner* — Lucy Chien
(74) *Attorney, Agent, or Firm* — Andrew C. Cheng

(57) ABSTRACT

The invention discloses a backlight module. The backlight module includes a light guide plate having an incident side; a mounting bracket including a vertical portion and a horizontal portion, wherein the vertical portion is opposite to the incident side, a gap exists between the vertical portion and the incident side, the vertical portion has a plurality of mounting holes, and the mounting holes pass through the vertical portion and the horizontal portion, thereby forming a plurality of grooves on the horizontal portion; a plurality of optical fibers, wherein the optical fibers are respectively disposed in the grooves and the mounting holes, emitting end faces of the optical fibers are attached to the incident side, and the optical fibers are used for guiding the ambient light into the light guide plate; and a plurality of slide assemblies, wherein the slide assemblies are respectively put around the optical fibers and fixed on the optical fibers, and the sliding assemblies are respectively disposed in the grooves and able to move with expansion or contraction of the light guide plate. The invention also discloses a liquid crystal display device having the backlight module.

8 Claims, 2 Drawing Sheets

BACKLIGHT MODULE AND LIQUID CRYSTAL DISPLAY DEVICE

BACKGROUND OF THE INVENTION

Field of the Invention

The present invention belongs to the technical field of liquid crystal display, in particular, to a backlight module and a liquid crystal display device.

Description of Related Art

Nowadays, most of backlight modules of liquid crystal display (Liquid Crystal Display, referred to LCD) device take the original light sources as backlights. The original light source emits light by the use of electricity, such as a light emitting diode (Light Emitting Diode, referred to as LED). LED has the advantage of energy-efficient, no it is widely used as a backlight source of backlight module. But as people pay more attention to energy saving in the future, the current power consumption of the backlight source of the backlight module needs to be further reduced, which needs to reduce the number of LEDs to achieve the reduction of power consumption of the backlight source, or use a new energy-saving source as the backlight source of the backlight module to achieve further energy saving.

Using ambient light (such as sunlight), as a backlight source of the backlight module is a new energy-saving program, which does not require the use of the original light source powered by electricity, or could reduce the proportion of the use of the original light sources, greatly reducing energy consumption. Currently, the backlight module using ambient light as a backlight source uses multiple optical fibers to conduct ambient light after collecting the ambient light, and by the emitting end face of the each optical fiber the collected ambient light is emitted into the backlight module. FIG. 1 is a structural schematic diagram of a backlight module using ambient light as a backlight source according to a prior art. Referring to FIG. 1, the backlight module of the prior art includes a light guide plate 110, an optical fiber 120 and a holder 130 fixing the optical fiber 120. The light guide plate 110 includes an incident side 111. The optical fiber 120 is fixed to the holder 130, and the emitting end face 121 of the optical fiber 120 is attached to the incident side 111. Thus, when the outside temperature or the self-heating temperature of the backlight module leads to expansion of the light guide plate 110, due to the optical fiber 120 is rigidly fixed, cannot moved, the undesirable phenomena such as breaking the optical fiber 120 will appear.

SUMMARY OF THE INVENTION

In order to solve the above problems of the prior art, an object of the invention is to provide a backlight module including a light guide plate having an incident side; a mounting bracket including a vertical portion and a horizontal portion, wherein the vertical portion is opposite to the incident side, a gap exists between the vertical portion and the incident side, the vertical portion has a plurality of mounting holes, and the mounting holes pass through the vertical portion and the horizontal portion, thereby forming a plurality of grooves on the horizontal portion; a plurality of optical fibers, wherein the optical fibers are respectively disposed in the grooves and the mounting holes, emitting end faces of the optical fibers are attached to the incident side, and the optical fibers are used for guiding the ambient light into the light guide plate; and a plurality of slide assemblies, wherein the slide assemblies are respectively put around the optical fibers and fixed on the optical fibers, and the sliding assemblies are respectively disposed in the grooves and able to move with expansion or contraction of the light guide plate.

Further, the slide assembly includes a fiber jacket and an elastic element. The fiber jacket is put around the optical fiber and fixed on the optical fiber. The outer surface of the fiber jacket has a circumferential projection. The central portion of the groove has a receiving concave. The bottom of the receiving concave and the bottom of the groove form a first step and a second step. The fiber jacket is placed in the groove. The circumferential projection is against the first step. The elastic member is movably put around the fiber jacket and placed in the receiving concave. One end of the elastic member abuts the circumferential projection, and the other end of the elastic member abuts the second step.

Further, the backlight module farther includes a plurality of fixed covers, wherein the fixed cover includes a first arch and fixed portions respectively extending from two sides of the first arch, the fixed portion and a surface of the horizontal portion are fixedly connected to make the first arch fixed on the groove, and thereby the slide assembly is engaged between the first arch and the groove.

Further, the slide assembly includes a fiber jacket. The fiber jacket is put around the optical fiber and fixed on the optical fiber. The outer surface of the fiber jacket has a bump. The connection between a surface of the horizontal portion and the groove has an engaging recess. The bump is placed in the engaging recess to make the fiber jacket engaged in the groove. The bump is made of an elastic material.

Further, the backlight module further includes a fixing bar, wherein the fixing bar includes a plurality of convex portions and a second arch set among the convex portions, the fixing bar is fixed on the surface of the horizontal portion, the convex portion is fixed on the engaging recess to make the bump engaged between the convex portion and the engaging recess, and the second arch is fixed on the groove to make the fiber jacket engaged between the second arch and the groove.

Another object of the present invention is to provide a liquid crystal display device including a backlight module and a liquid crystal display panel on the backlight module. The backlight module provides light for the liquid crystal display panel, so that the liquid crystal display panel is able to display an image. The backlight module is as above.

In the backlight module and the liquid crystal display device of the present invention, during the thermal expansion or cooling contraction of the light guide plate, the slide assembly moves to drive the optical fiber so as to avoid the undesirable phenomena such as breaking the optical fiber.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
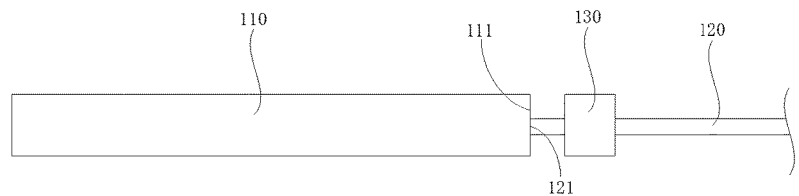
FIG. 1 is a structural schematic diagram of a backlight module using ambient light as a backlight source according to a prior art.

Following exemplary embodiments with reference of figures are only used for describing the disclosure in detail. However, the disclosure can also be achieved through different implementations, which is not limited to the following embodiments. In the figures referred to herein, sizes and relative sizes of different layers are probably exaggerated for clarity of illustration and are not necessarily drawn to scale.

In the drawings, the same reference numerals will be used to denote the same elements. It will be understood that, although the term may be used herein "first", "second", and so on to describe various elements, these elements should not be limited by these terms. These terms are only used to distinguish one element from another separate.

Figure 2:
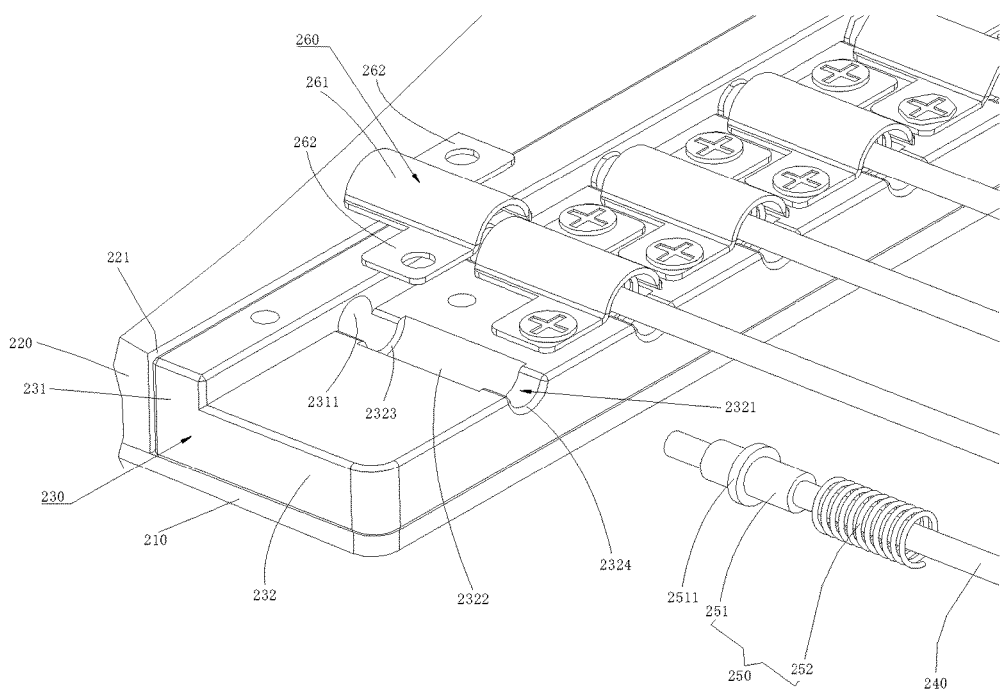
FIG. 2 is a partial schematic perspective view of the backlight module according to a first embodiment of the present invention.
Figure 3:
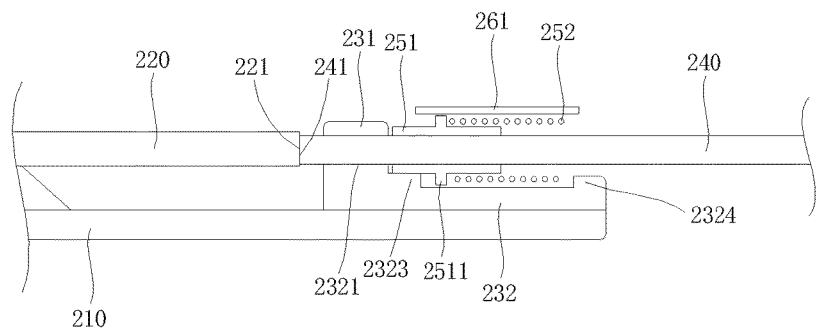
FIG. 3 is a partial cross-section of the backlight module according to a first embodiment of the present invention.

FIG. 2 is a partial schematic perspective view of the backlight module according to a first embodiment of the present invention. FIG. 3 is a partial cross-section of the backlight module according to the first embodiment of the present invention.

Refer to FIG. 2 and FIG. 3, the backlight module 210 of the first embodiment of the present invention includes a backplane 210, a light guide plate 220, a mounting bracket 230, a plurality of optical fibers 240, and a plurality of slide assemblies 250.

Specifically, the light guide plate 220 is disposed above the backplate 210, and has an incident side 221. The mounting bracket 230 is fixedly disposed on the backplane 210. The mounting bracket 230 includes a vertical portion 231 and a horizontal portion 232. The vertical portion 231 is opposite to the incident side 221. A gap with a distance exists between the vertical portion 331 and the incident side 221. The vertical portion 331 has a plurality of mounting holes 2311. Each mounting hole 2311 passes through the vertical portion 231 and the horizontal portion 232, thereby forming a plurality of grooves 2321 on the horizontal portion 232. Each optical fiber 240 is disposed in a corresponding groove 2321 and a corresponding mounting hole 2311, and the emitting, end face 241 of each optical fiber 240 are attached to the incident side 221. Each optical fiber 240 guides the ambient light collected by ambient light collecting means (not shown) into the light guide plate 221 by the incident side 221. Each slide assembly 250 is put around a corresponding optical fiber 240 and fixed on the corresponding optical fiber 240. Each sliding assembly 250 is disposed in a corresponding groove 2321 and able to move to drive the corresponding optical fiber 240 in the groove 2321 so as to avoid the undesirable phenomena such as breaking the optical fiber 240 during the thermal expansion or cooling contraction of the light guide plate 220.

Each slide assembly 250 includes a fiber jacket 251 and an elastic element 252. The fiber jacket 251 is put around the corresponding optical fiber 240 and fixed on the corresponding optical fiber 240. In the embodiment, the fiber jacket 251 and the corresponding optical fiber 240 can be fixed together by glue or other adhesives. The outer surface of the fiber jacket 251 has a circumferential projection 2511. In the embodiment, the circumferential projection 2511 may be disposed in the middle portion of the fiber jacket 251, but the present invention is not limited thereto. The central portion of each groove 2321 has a receiving concave 2322. The bottom of each receiving concave 2322 and the bottom of the corresponding groove 2321 form a first step 2323 and a second step 2324. The fiber jacket 251 is placed in the groove 2321. The circumferential projection 2511 is against the first step 2323. The elastic member 252 is movably put around the fiber jacket 251 and placed in the receiving concave 2322. One end of the elastic member 252 abuts the circumferential projection 2511, and the other end of the elastic member 252 abuts the second step 2324. When the light guide plate 220 is displaced by thermal expansion or cooling contraction, the displacement of light guide plate 220 makes the elastic member 252 of the slide assembly 250 contract or expand to drive the optical fiber 240 back or forward, so that the emitting end face 241 of the optical fiber 240 is always attached to the incident side 221, avoiding the undesirable phenomena such as breaking the optical fiber 120.

In order to better reinforce firmness of the fiber assembly 240 and the slide assembly 250, the backlight module according to the embodiment of the invention further includes a plurality of fixed covers 260. Each fixed cover 260 includes a first arch 261 and fixed portions 262 respectively extending from two sides of the first arch 261. The fixed portion 262 and a surface of the horizontal portion 232 are fixedly connected to make the first arch 261 fixed on the groove 2321, and thereby the slide assembly 250 and the optical fiber 240 are engaged between the first arch 261 and the groove 2321.

Figure 4:
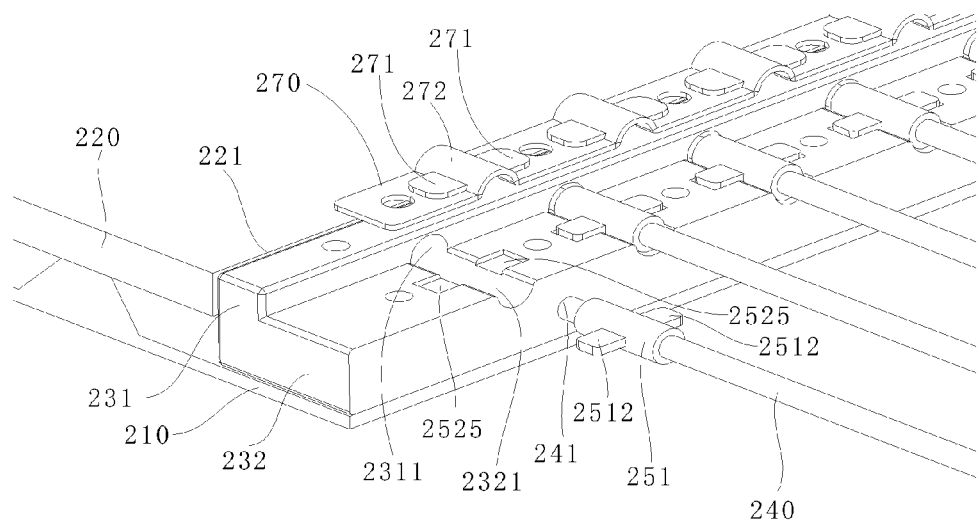
FIG. 4 is a partial schematic perspective view of the backlight module according to a second embodiment of the present invention.

FIG. 4 is a partial schematic perspective view of the backlight module according to a second embodiment of the present invention.

The description of the second embodiment only discloses the differences with the first embodiment, and the similarities with the first embodiment are omitted. Referring to FIG. 4, the differences with the first embodiment are as below. Each slide assembly 250 includes a fiber jacket 251. The fiber jacket 251 is put around the corresponding optical fiber 240 and fixed on the corresponding optical fiber 240. In the embodiment, the fiber jacket 251 and the corresponding optical fiber 240 may be fixed together by an adhesive such as glue. The outer surface of the fiber jacket 251 has two bumps 2512. In the embodiment, the two bumps 2512 may be set in the middle portion of the fiber jacket 251, but the present invention is not limited thereto. The connection between a surface of the horizontal portion 232 and the groove 2321 has an engaging recess 2325, meaning that the two sides of each groove 2321 each has an engaging recess 2325. Each bump 2512 is placed in the corresponding engaging recess 2325 to make the fiber jacket 251 engaged in the groove 2321. Each bump 2512 is made of an elastic material. When the light guide plate 220 is displaced by thermal expansion or cooling contraction, the displacement of light guide plate 220 makes each bumps 2512 made of the elastic material contract or expand to drive the optical fiber 240 back or forward, so that the emitting end face 241 of the optical fiber 240 is always attached to the incident side 221, avoiding the undesirable phenomena such as breaking the optical fiber 120. In the present embodiment, each of the bumps 2512 may be made of rubber or In order to better reinforce firmness of the optical fiber 240 and the slide assembly 250, the backlight module according to the embodiment of the invention further includes a fixing bar 270. The fixing bar 270 has a plurality of convex portions 271 and a second arch 272 set among the convex portions 271. The fixing bar 270 is fixed on the surface of the horizontal portion 232. Each convex portion 271 is fixed on the corresponding engaging recess 2325 to make the corresponding bump 2512 engaged between the convex portion 271 and the engaging recess 2325. The second arch 272 is fixed on the groove 2321 to make the fiber jacket 251 engaged between the second arch 272 and the groove 2321.

Figure 5:
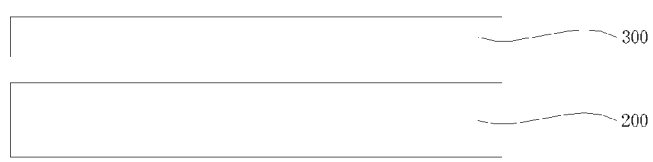
FIG. 5 is a schematic diagram of the liquid crystal display device according to an embodiment of the present invention.

FIG. 5 is a schematic diagram of the liquid crystal display device according to an embodiment of the present invention.

Refer to FIG. 5. A liquid crystal display device according to the embodiment of the present invention includes a backlight module 200 and a liquid crystal display panel 300 on the backlight module 200. The backlight module 200 provides light for the liquid crystal display panel 300, so that the liquid crystal display panel 300 is able to display an image. The backlight module 200 is as the backlight module of the first or second embodiment above.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A backlight module, comprising:
a light guide plate, having an incident side;
a mounting bracket including a vertical portion and a horizontal portion, wherein the vertical portion is opposite to the incident side, a gap exists between the vertical portion and the incident side, the vertical portion has a plurality of mounting holes, and the mounting holes pass through the vertical portion and the horizontal portion, thereby forming a plurality of grooves on the horizontal portion;
a plurality of optical fibers, wherein the optical fibers are respectively disposed in the grooves and the mounting holes, emitting end faces of the optical fibers are attached to the incident side, and the optical fibers are used for guiding the ambient light into the light guide plate; and
a plurality of slide assemblies, wherein the slide assemblies are respectively put around the optical fibers and fixed on the optical fibers, and the sliding assemblies are respectively disposed in the grooves and able to move with expansion or contraction of the light guide plate,
wherein the slide assembly includes a fiber jacket and an elastic element, the fiber jacket is put around the optical fiber and fixed on the optical fiber, the outer surface of the fiber jacket has a circumferential projection, the central portion of the groove has a receiving concave, the bottom of the receiving concave and the bottom of the groove form a first step and a second step, the fiber jacket is placed in the groove, the circumferential projection is against the first step, the elastic member is movably put around the fiber jacket and placed in the receiving concave, one end of the elastic member abuts the circumferential projection, and the other end of the elastic member abuts the second step.

2. The backlight module according to claim 1, further comprising a plurality of fixed covers, wherein the fixed cover includes a first arch and fixed portions respectively extending from two sides of the first arch, the fixed portion and a surface of the horizontal portion are fixedly connected to make the first arch fixed on the groove, and thereby the slide assembly is engaged between the first arch and the groove.

3. A backlight module, comprising:
a light guide plate, having an incident side;
a mounting bracket including a vertical portion and a horizontal portion, wherein the vertical portion is opposite to the incident side, a gap exists between the vertical portion and the incident side, the vertical portion has a plurality of mounting holes, and the mounting holes pass through the vertical portion and the horizontal portion, thereby forming a plurality of grooves on the horizontal portion;
a plurality of optical fibers, wherein the optical fibers are respectively disposed in the grooves and the mounting holes, emitting end faces of the optical fibers are attached to the incident side, and the optical fibers are used for guiding the ambient light into the light guide plate; and
a plurality of slide assemblies, wherein the slide assemblies are respectively put around the optical fibers and fixed on the optical fibers, and the sliding assemblies are respectively disposed in the grooves and able to move with expansion or contraction of the light guide plate,
wherein the slide assembly includes a fiber jacket, the fiber jacket is put around the optical fiber and fixed on the optical fiber, the outer surface of the fiber jacket has a bump, the connection between a surface of the horizontal portion and the groove has an engaging recess, the bump is placed in the engaging recess to make the fiber jacket engaged in the groove, and the bump is made of an elastic material.

4. The backlight module according to claim 3, further comprising a fixing bar, wherein the fixing bar comprises a plurality of convex portions and a second arch set among the convex portions, the fixing bar is fixed on the surface of the horizontal portion, the convex portion is fixed on the engaging recess to make the bump engaged between the convex portion and the engaging recess, and the second arch is fixed on the groove to make the fiber jacket engaged between the second arch and the groove.

5. A liquid crystal display device comprising a backlight module and a liquid crystal display panel on the backlight module, the backlight module providing light for the liquid crystal display panel, so that the liquid crystal display panel is able to display an image, wherein the backlight module comprises:
a light guide plate, having an incident side;
a mounting bracket including a vertical portion and a horizontal portion, wherein the vertical portion is opposite to the incident side, a gap exists between the vertical portion and the incident side, the vertical portion has a plurality of mounting holes, and the mounting holes pass through the vertical portion and the horizontal portion, thereby forming a plurality of grooves on the horizontal portion;
a plurality of optical fibers, wherein the optical fibers are respectively disposed in the grooves and the mounting holes, emitting end faces of the optical fibers are attached to the incident side, and the optical fibers are used for guiding the ambient light into the light guide plate; and
a plurality of slide assemblies, wherein the slide assemblies are respectively put around the optical fibers and fixed on the optical fibers, and the sliding assemblies are respectively disposed in the grooves and able to move with expansion or contraction of the light guide plate, wherein the slide assembly includes a fiber jacket and an elastic element, the fiber jacket is put around the optical fiber and fixed on the optical fiber, the outer surface of the fiber jacket has a circumferential projection, the central portion of the groove has a receiving concave, the bottom of the receiving concave and the bottom of the groove form a first step and a second step, the fiber jacket is placed in the groove, the circumferential projection is against the first step, the elastic member is movably put around the fiber jacket and placed in the receiving concave, one end of the elastic member abuts the circumferential projection, and the other end of the elastic member abuts the second step.

6. The liquid crystal display device according to claim 5, further comprising a plurality of fixed covers, wherein the fixed cover includes a first arch and fixed portions respectively extending from two sides of the first arch, the fixed portion and a surface of the horizontal portion are fixedly connected to make the first arch fixed on the groove, and thereby the slide assembly is engaged between the first arch and the groove.

7. A liquid crystal display device comprising a backlight module and a liquid crystal display panel on the backlight module, the backlight module providing light for the liquid crystal display panel, so that the liquid crystal display panel is able to display an image, wherein the backlight module comprises:
 a light guide plate, having an incident side;
 a mounting bracket including a vertical portion and a horizontal portion, wherein the vertical portion is opposite to the incident side, a gap exists between the vertical portion and the incident side, the vertical portion has a plurality of mounting holes, and the mounting holes pass through the vertical portion and the horizontal portion, thereby forming a plurality of grooves on the horizontal portion;
 a plurality of optical fibers, wherein the optical fibers are respectively disposed in the grooves and the mounting holes, emitting end faces of the optical fibers are attached to the incident side, and the optical fibers are used for guiding the ambient light into the light guide plate; and
 a plurality of slide assemblies, wherein the slide assemblies are respectively put around the optical fibers and fixed on the optical fibers, and the sliding assemblies are respectively disposed in the grooves and able to move with expansion or contraction of the light guide plate,
 wherein the slide assembly includes a fiber jacket, the fiber jacket is put around the optical fiber and fixed on the optical fiber, the outer surface of the fiber jacket has a bump, the connection between a surface of the horizontal portion and the groove has an engaging recess, the bump is placed in the engaging recess to make the fiber jacket engaged in the groove, and the bump is made of an elastic material.

8. The liquid crystal display device according to claim 7, further comprising a fixing bar, wherein the fixing bar comprises a plurality of convex portions and a second arch set among the convex portions, the fixing bar is fixed on the surface of the horizontal portion, the convex portion is fixed on the engaging recess to make the bump engaged between the convex portion and the engaging recess, and the second arch is fixed on the groove to make the fiber jacket engaged between the second arch and the groove.

* * * * *